(12) United States Patent
Yotsuya (10) Patent No.: US 6,603,638 B2
(45) Date of Patent: Aug. 5, 2003

(54) FLOATING-TYPE HEAD SLIDER AND RECORDING/REPRODUCING APPARATUS EMPLOYING THE SAME

(75) Inventor: Michio Yotsuya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/896,475

(22) Filed: Jun. 29, 2001

(65) Prior Publication Data

US 2002/0071217 A1 Jun. 13, 2002

(30) Foreign Application Priority Data

Jul. 4, 2000 (JP) ........................................ 2000-202218
Mar. 21, 2001 (JP) ........................................ 2001-080572

(51) Int. Cl.[7] ................................................ G11B 5/60
(52) U.S. Cl. .................................. 360/235.6; 360/236.3
(58) Field of Search ............................... 360/235.4–237

(56) References Cited

U.S. PATENT DOCUMENTS

| 5,430,591 | A |   | 7/1995  | Takeuchi et al. |         |
|-----------|---|---|---------|-----------------|---------|
| 5,654,853 | A | * | 8/1997  | Hagen           | 360/237 |
| 6,144,528 | A | * | 11/2000 | Dufresne et al. | 360/235.4 |
| 6,483,667 | B1| * | 11/2002 | Berg et al.     | 360/235.6 |

FOREIGN PATENT DOCUMENTS

| EP | 0110212  | 6/1984  |
| JP | 05258264 | 10/1993 |
| JP | 06215516 | 8/1994  |
| JP | 06333354 | 12/1994 |
| JP | 07037352 | 2/1995  |
| JP | 11102582 | 4/1999  |
| JP | 11238213 | 8/1999  |

\* cited by examiner

*Primary Examiner*—A. J. Heinz
(74) *Attorney, Agent, or Firm*—Jay H. Maioli (57) ABSTRACT

A floating-type head slider having a rail plane that functions as an air bearing in accordance with a kinetic pressure of an air flow caused by rotation of a recording medium, that supports a recording/reproducing device for recording and reproducing information, and that keeps a predetermined gap between the device and a surface of the recording medium, wherein an edge of the rail plane includes only segments of ellipses and circles, and tangent lines of the segments, preferably the edge of the rail plane is continuous to provide a floating head slider having high reliability even in a dusty environment and a recording/reproducing apparatus in which such a floating head slider is employed.

6 Claims, 14 Drawing Sheets

AIR INTRODUCING DIRECTION

III—III

FLOATING-TYPE HEAD SLIDER AND RECORDING/REPRODUCING APPARATUS EMPLOYING THE SAME

BACKGROUND OF THE INVENTION

1. Field of the Invention

The present invention relates to a floating-type head slider which is, for example, provided in a magnetic recording/reproducing apparatus and configured to have a magnetic head float over a surface of a recording medium at the time of driving, and a recording/reproducing apparatus having such a head slider.

2. Description of the Related Art

Generally, in a recording/reproducing apparatus such as a hard disk device, it is necessary to avoid wear/damage due to contact of a surface of a magnetic disk with a magnetic head. Accordingly, a floating-type slider having an air bearing surface (air lubricating surface) is provided for a magnetic head so as to ensure a predetermined gap between the magnetic head and a magnetic disk by means of an air pressure at the time of disk rotation, which results in information recording in a non-contact manner.

Figure 13:
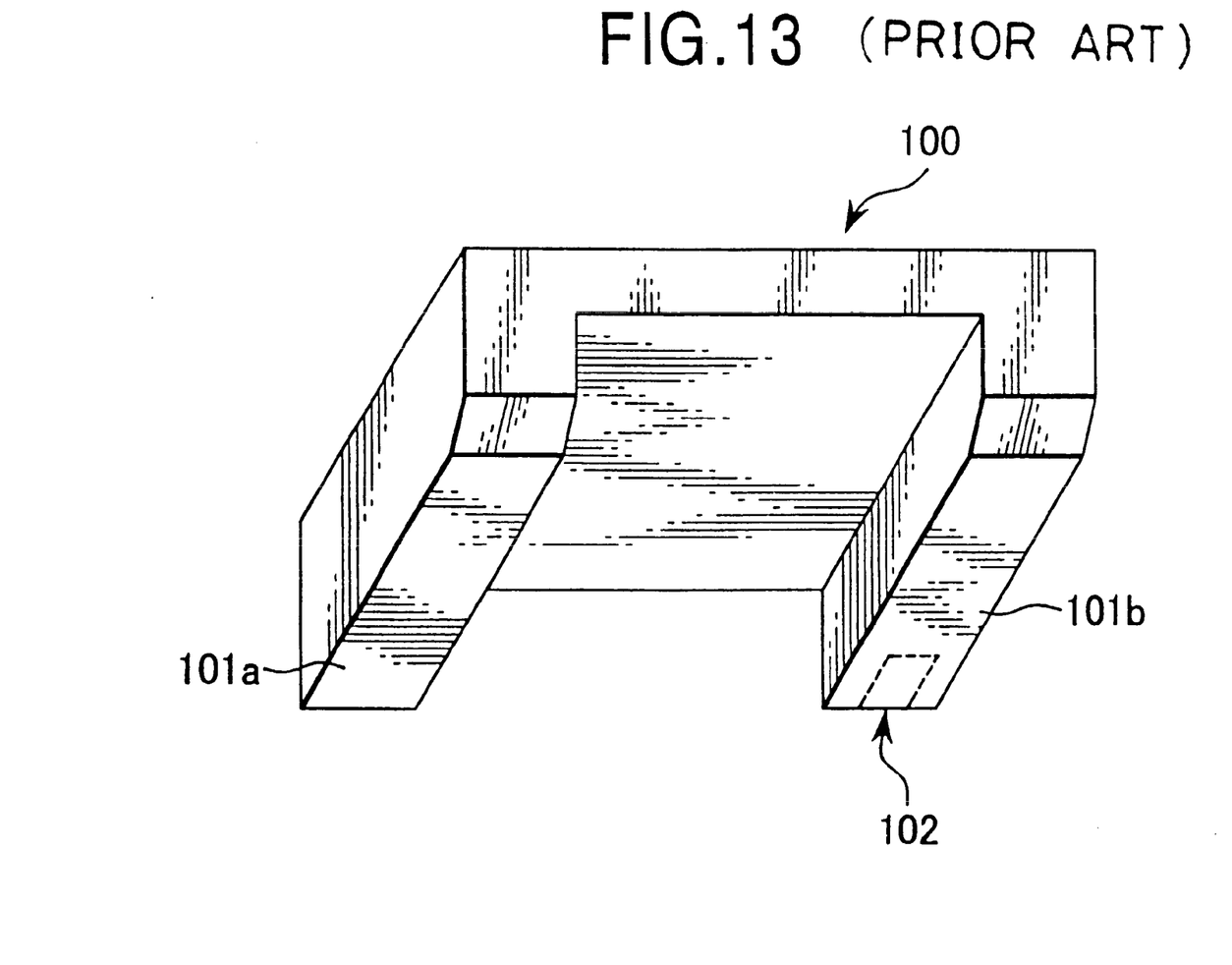
FIG. 13 is a perspective view of a general slider, viewed from underneath.
Figure 14:
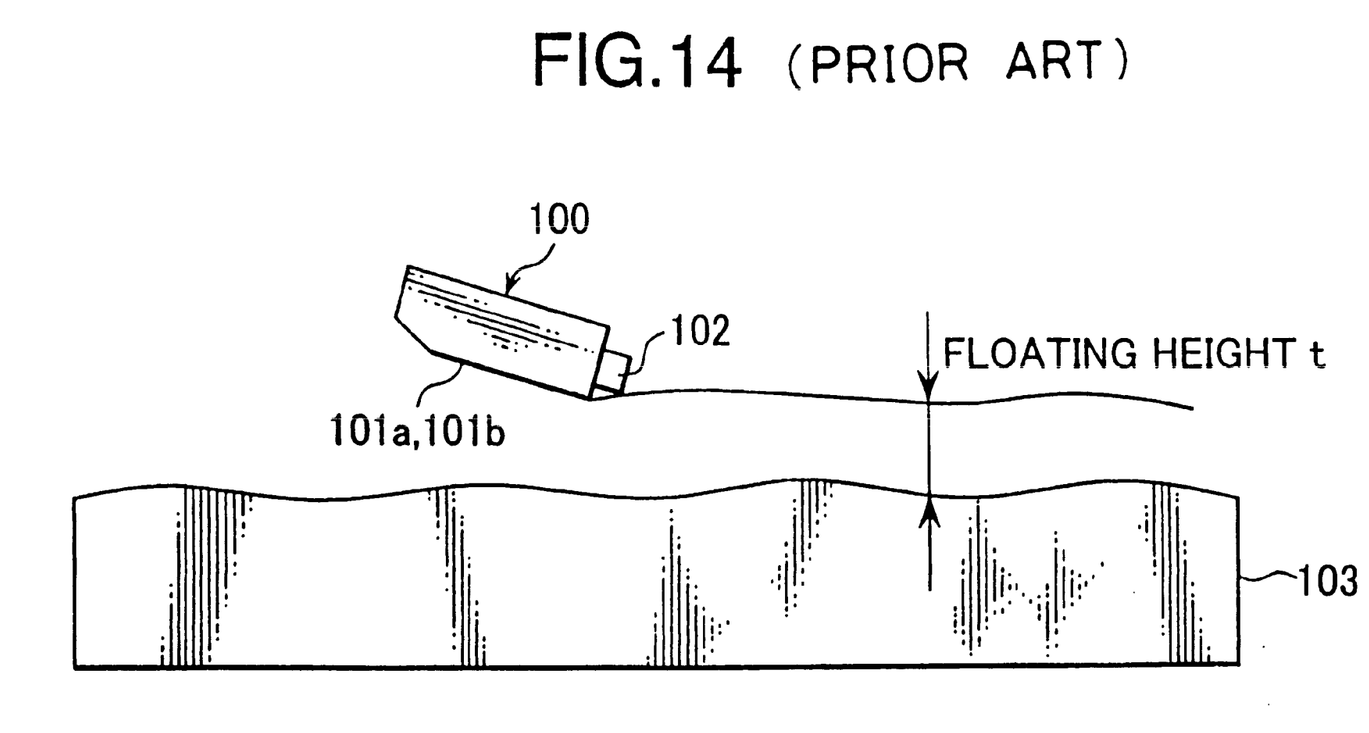
FIG. 14 is a schematic view for explaining an operation of the general slider.

FIG. 13 is a perspective view showing a general slider 100 viewed from underneath. As shown in FIG. 13, the slider 100 is arranged to have rails 101a, 101b each having an air bearing surface (air lubricating surface), and a magnetic head 102 is fixed at an end surface of the rail 101b. And, as shown in FIG. 14, an airflow generated when a magnetic disk 103 is rotated produces a floating power (pressure) onto the rails 101a and 101b. The floating power makes the slider 100 and the magnetic head 102 float above a surface of the magnetic disk 103 with a slight gap (flying height) therebetween. There have been realized a flying height of about 0.04 $\mu$m in a currently commercially available hard disk drive, and that of about 0.02 $\mu$m in a study level.

According to a hard disk device of a floating head type, as described above, even in a case of a disk having unevenness on a surface thereof, it is possible to reduce a spacing loss by making the magnetic head follow the unevenness on the surface. In addition, it is possible to prevent a magnetic head from contacting with a surface a magnetic disk so as to prevent the magnetic disk from wear and damage.

By the way, as described above, the flying height of the slider is significantly minute. Accordingly, even in a case where a quite small amount of dust comes into the hard disk device, there may be caused a serious damage to the hard disk device. Therefore, it is a usual manner that a hard disk device is assembled in a highly controlled clean room.

However, in a removable-type hard disk device in which a disk can be attached/detached, there is always a large slot provided to the hard disk device for inserting and pulling out a recording medium, and, inevitably, dusts of an amount existing in a usual life environment always come into the device. Once a dust comes into the air bearing surface of the floating-type head slider, the amount of the flying height changes and data cannot be recorded and read correctly, or further, the data may be damaged due to the contact of the slider with the disk. Accordingly, in a removable-type hard disk device employing a floating-type head system, dust control becomes the most important problem to be solved.

In addition, in late years, there are many cases using a personal computer in the open air along with the significant popularization of notebook type personal computers. In a case of taking out and using a personal computer in the open air, possibility of various kinds of vibration and shock to be given to a built-in hard disk device increases, which brings a problem of damages to the hard disk due to vibration caused by a slider. Because a spring hardness itself of an air film generated by air pressure caused between a slider and a magnetic disk at the time of disk rotation has a hardness of about 50 times of that of a suspension which supports a car, the slider hardly vibrates widely due to some vibration or shock externally given. However, in a case where a housing of the personal computer hits some corner or a case where the personal computer itself hits the ground, the slider may vibrate widely and contact with the hard disk. Accordingly, it is quite dangerous to mount a hard disk device in a personal computer for outdoor use, in view of data protection.

However, in consideration of an advantage of the hard disk device being high-speed processing, large capacity and low in price, even in a case of a notebook type personal computer premised to be used outdoors, there is no other choice than employment of a hard disk device. Accordingly, a hard disk device is required to secure reliability in a case of receiving external vibration and shock, in other words, it is quite important to prevent a slider from contacting with the hard disk.

SUMMARY OF THE INVENTION

The present invention is made in consideration of the above-described problem to be solved and there are provided a floating head slider having high reliability even in an environment to which dust may come into and a recording/reproducing apparatus in which such a floating head slider is employed.

In order to solve the above problem, according to a first essential view point, there is provided a floating-type head slider having at least a rail plane which functions as an air bearing in accordance with a kinetic pressure of an air flow caused by rotation of a recording medium, which supports a recording/reproducing device for recording and reproducing information keeping a predetermined gap between the device and a surface of the recording medium, wherein all of or almost all of edges (i.e., rails) of the rail plane comprises only a plurality of straight lines and arcs each being a part of one of an ellipse and a circle, for smoothly connecting ends of two of the straight lines. Herein, it is preferable that an edge of the rail plane which is positioned at a same height level is configured to be continuously endless.

According to such configuration, in a case of sudden contact of a slider with a magnetic disk due to vibration and shock given to the slider, it becomes less possible to damage a surface of a disk by configuring the edge (rail) of the rail plane with only a plurality of straight lines and arcs each being a part of an ellipse or a circle for smoothly connecting ends of two of the straight lines. Incidentally, it is preferable that the head slider comprises a plurality of rail planes with a plurality of height levels.

Furthermore, it is desirable that an area of a rail plane which comes closest to the magnetic disk is 30% or more, more preferably, 40% or more of the entire area, which functions as the air bearing, of the slider.

According to such a configuration, in a slider having multi-level edges (rails), when an area of a first rail plane which comes closest to the magnetic disk is set to be as large as possible against to an entire area of an air bearing surface of the slider, it is possible to reduce variation in floating height even in a case where a dust sticks onto the rail plane.

In addition, even in a case where the slider comes into contact with the disk, because the contact pressure between the slider and the disk is kept low, it becomes less possible that the disk is damaged.

In addition, it is desirable that the rail plane comprises at least leg portions provided at a center portion and both end portions opposing to a moving direction and a connecting portion provided ahead in the moving direction for connecting among the leg portions. According to such construction, the rail plane has a comb-like shape.

In addition, according to a second essential view point of the present invention, there is provided a recording/reproducing device having a floating-type head slider having at least a rail plane which functions as an air bearing in accordance with a kinetic pressure of an air flow caused by rotation of a recording medium, which supports a recording/reproducing device for recording and reproducing information keeping a predetermined gap between the device and a surface of the recording medium, wherein an edge of the rail plane comprises only a plurality of straight lines and arcs being a part of an ellipse or a circle, for smoothly connecting ends of two of the straight lines.

According to such constitution, a recording/reproducing device having the floating-type head slider according to the first point of view can be provided.

As described above, according to the present invention, a floating-type head slider having high reliability even in an environment into which a dust may come and a recording/reproducing apparatus in which such a floating-type head slider is employed can be provided.

Incidentally, the other characteristic features of the present invention and significant effect introduced by the present invention can be understood by the following description of embodiments of the present invention and attached drawings.

DESCRIPTION OF THE PREFERRED EMBODIMENT

Now, an embodiment of the present invention will be described with reference to the drawings.

Figure 1:
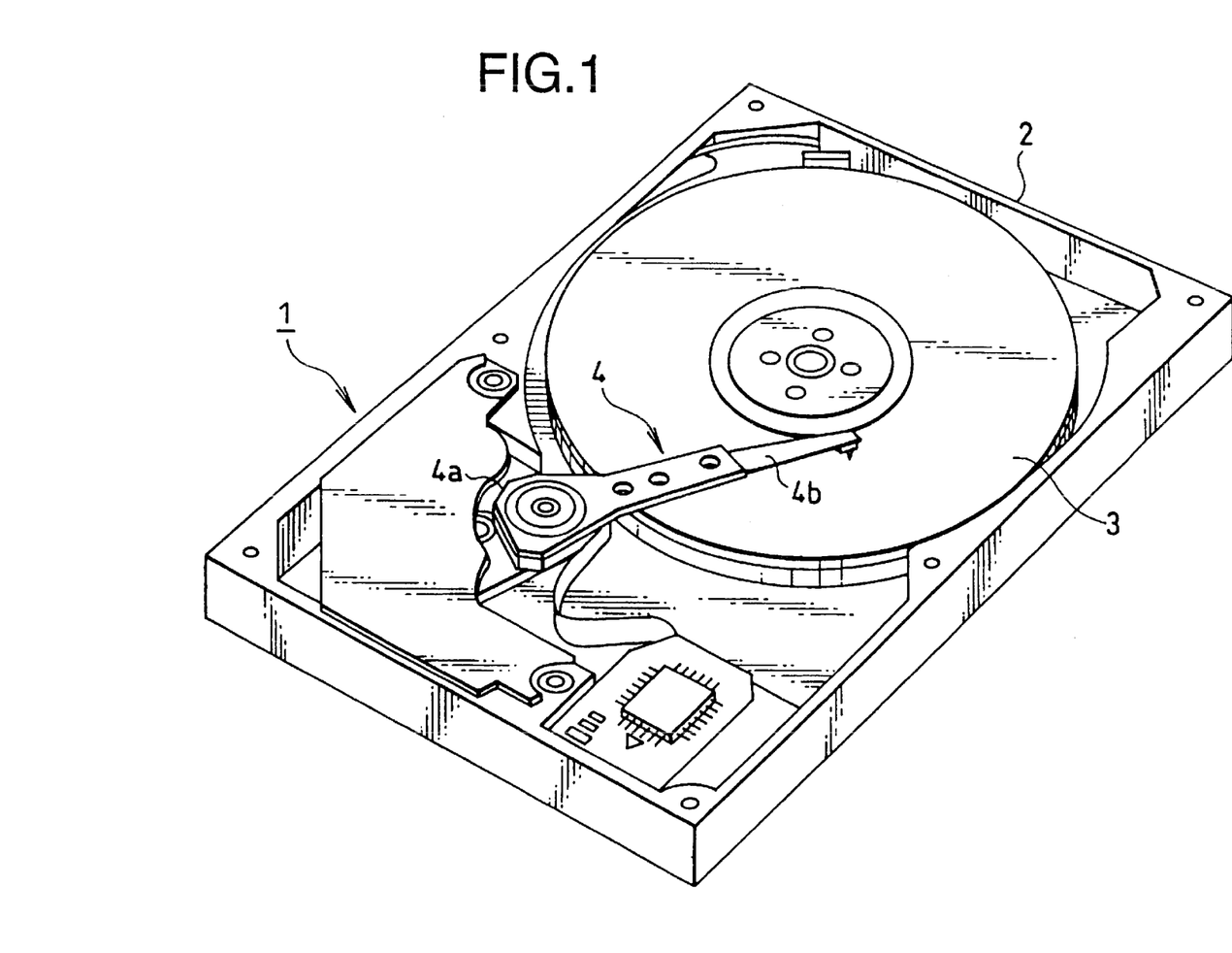
FIG. 1 is a perspective view showing a magnetic disk device according to an embodiment of the present invention.

FIG. 1 is a perspective view showing an example of a configuration of a hard disk device 1 (hard disk drive) built in or externally connected to a computer or the like.

In FIG. 1, reference numeral 2 shows a housing of the hard disk device 1. A spindle motor which is not shown in the figure is installed on a bottom portion of the housing 2. A magnetic disk 3 is rotatively driven at a fixed angular velocity by the spindle motor.

In addition, a base end portion 4a of an arm 4 is swingably held at a corner of the housing 2. A voice coil motor which is not shown in the figure is connected to a base end portion 4a of the arm 4, and swingably drives a tip portion 4b of the arm 4 along a top surface of the magnetic disk 3.

Figure 2:
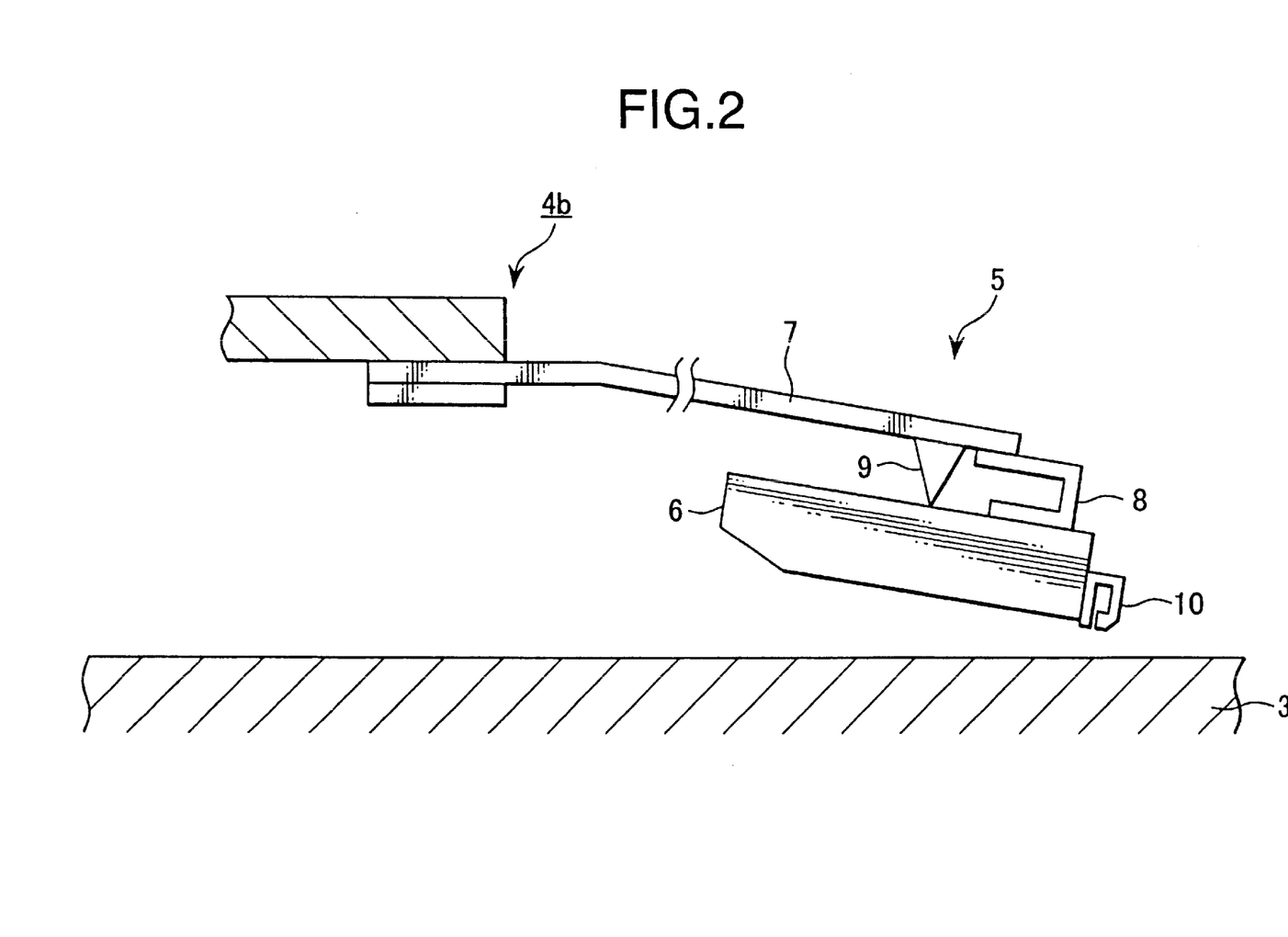
FIG. 2 is a schematic structural view enlargedly showing a tip portion of an arm of the apparatus shown in FIG. 1.

As shown in FIG. 2, the slider 6 of the present embodiment is held at the tip portion 4b of the arm 4 via a suspension 5. The suspension 5 comprises a spring portion 7 fixed on the side of the base end portion 4a of the arm 4, and a gimbal 8 and a pivot 9 for connecting the slider 6 to the spring portion 7. In addition, the slider 6 has a function of ensuring a predetermined gap (flying height) between the slider 6 and the magnetic disk 3 by keeping a balance between a downward load applied by the suspension 5 and an upward floating power generated by the air pressure due to the rotation of the magnetic disk 3.

A magnetic head 10 is fixed at a rear end plane of the slider 6. The arm 4 is swingably driven when a predetermined voltage is applied to the voice coil motor. According thereto, the magnetic head 10 fixed to the slider 6 moves along a substantially radial direction of the magnetic disk 3, in other word, the slider 6 carries out a seeking operation, so as to record or reproduce information on or from a predetermined track of the magnetic disk 3.

Next, the structure of the slider 6 of the present embodiment will be explained in detail.

Figure 3A:
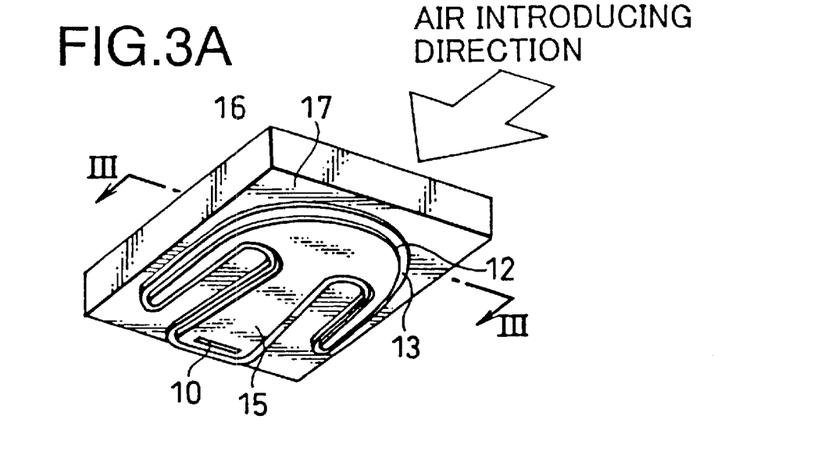
FIG. 3A is a perspective view of the slider shown in FIG. 2, viewed from underneath.
Figure 3B:
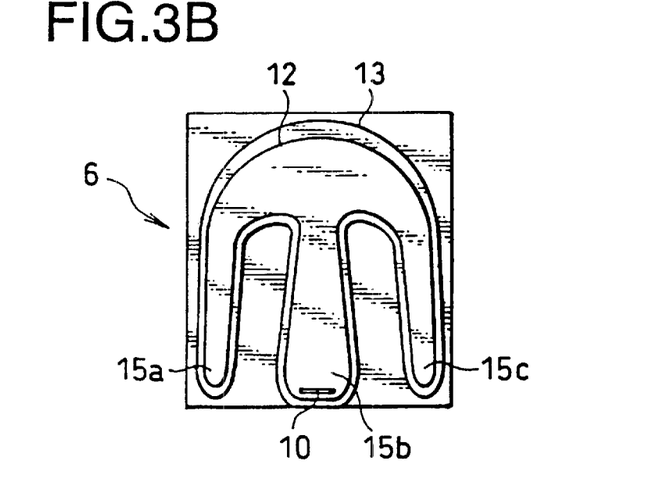
FIG. 3B is a plan view of the slider shown in FIG. 2.

FIG. 3A is a perspective view of the slider 6 viewed from underneath; FIG. 3B is a plan view of the slider 6; and FIG. 3C is a longitudinal cross-sectional view of the slider 6 cut along the line III—III.

Figure 3C:
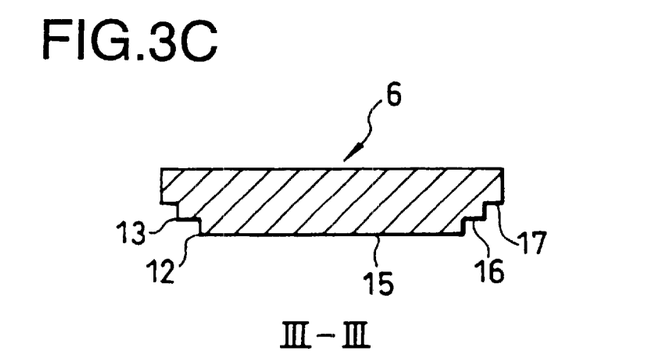
FIG. 3C is a longitudinal cross-sectional view of the slider shown in FIG. 3A, cut along the line III—III.

As shown in FIGS. 3A to 3C, the slider 6 has a first rail 12 and a second rail 13. In this description, a rail means an edge of a rail plane. With these rails 12 and 13, a first rail plane 15, a second rail plane 16 and a third rail plane 17 each having different height level are constituted. All of the first and second rails 12 and 13 comprises of straight lines and arcs each being a part of ellipses or circles to connect these straight lines smoothly, having an endless shape which are not segmented along the way. Furthermore, an air introducing end 11 of the first and second rails 12 and 13 has a single-peaked shape. The slider 6 is configured so that an area of the first rail plane 15 occupies more than 40% of the total area of the first, second and third rail planes 15–17.

In addition, the first rail plane 15 is formed to be a ctenoid, i.e., comb-like shape having three leg portions 15a–15c, and these three leg portions are mutually connected at a front side of the moving direction to be unified. According to such construction, there are formed negative pressure pockets 18 and 19 between the leg portions 15a and 15b and between the leg portions 15b and 15c, respectively. The magnetic head 10 is fixed to a rear end portion along a moving direction of the leg portion 15b which is positioned at the center of the slider 6.

Next, operation of the slider 6 having such construction will be explained.

The slider 6 is designed to utilize a positive pressure in a direction away from the magnetic disk 3 and a negative pressure in a direction toward the magnetic disk 3 so as to have a predetermined gap (flying height) between the magnetic disk 3 and the slider 6 keeping the difference between the positive pressure and the negative pressure and the load applied by the suspension in balance.

In this case, the area of the first rail plane 15 is relatively large in comparison with the other rail planes 16 and 17, the first rail plane 15 receives most of the above-mentioned positive pressure. Accordingly, in comparison with a conventional slider, it is possible with the slider 6 of the present invention to reduce the load per unit area on the rail plane closest to the magnetic disk 3.

According to the constitution described above, the following operation and effect can be attained.

First, even in a case where a dust is generated on the first rail plane 15, it becomes possible to maintain the flying height of the slider 6.

In other words, according to the construction described above, it is possible to have a large area for the first rail plane 15, it becomes possible to reduce charge of load per a unit area of the rail plane. Furthermore, power of resistance against a negative pressure increases by existence of a negative pressure pocket. Accordingly, even in a case where a dust exists on the first rail plane 15, influence for generation of a positive pressure can be kept small. This enables generation of a positive pressure enough for floating of the slider 6.

In the second place, even in a case where floatability falls down significantly due to the existence of a large amount of the dust and the slider 6 comes into contact with the magnetic disk 3, the contact pressure thereof can be kept small.

In other words, according to the above construction, the first rail plane 15 which is positioned at the highest level comes into contact with the magnetic disk 3 in such a case. In this case, because the charge of load per a unit area of a rail plane is small, as having mentioned above, the contact pressure with the magnetic disk 3 becomes small, as a result. This brings an effect that the magnetic disk 3 receives less damage.

In the third place, according to the above construction, since the rail plane is also formed in the leg portion 15b positioned at the center of the first rail plane 15 and all rails are formed endlessly with a plurality of straight lines and arcs each being a part of an ellipse and a circle for connecting end portions of one of the straight lines and another straight line smoothly, the magnetic disk 3 is less damaged.

Figure 10:
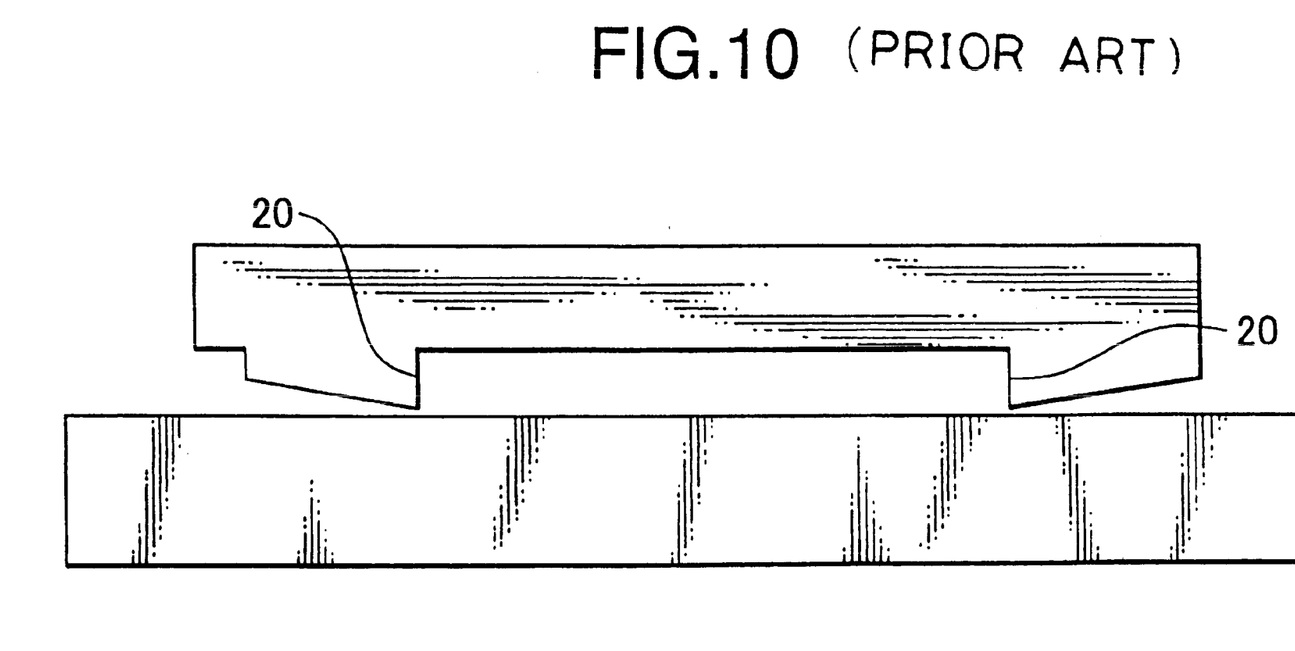
FIG. 10 is a schematic view for explaining a defect of a conventional slider.

In other words, in order to take a lot of air flow to stabilize the floatation, the air bearing surface of the slider 6 is generally processed so that the center portion thereof has a convex shape, that is, so-called "crown", toward the magnetic disk in comparison with the both edge portions. When a pad-type rail plane having processed to have a "crown" approaches the magnetic disk, as shown in FIG. 10, an edge portion 20 of a divided rail plane first comes into contact with the magnetic disk 3 geometrically, which results in a strong possibility of damage of the magnetic disk by a sharp edge of the rail plane.

On the other hand, the slider 6 of the present embodiment has the leg portion 15b at a center portion thereof and all rails are formed continuously. Furthermore, since there are formed the negative pressure pockets 18 and 19 between the leg portions 15a and 15b and leg portions 15b and 15c, respectively, a resistance force against the negative pressure improves. Accordingly, the problem mentioned above hardly occurs, and possibility to damage the disk with an edge of the rail becomes low.

Figure 11A:
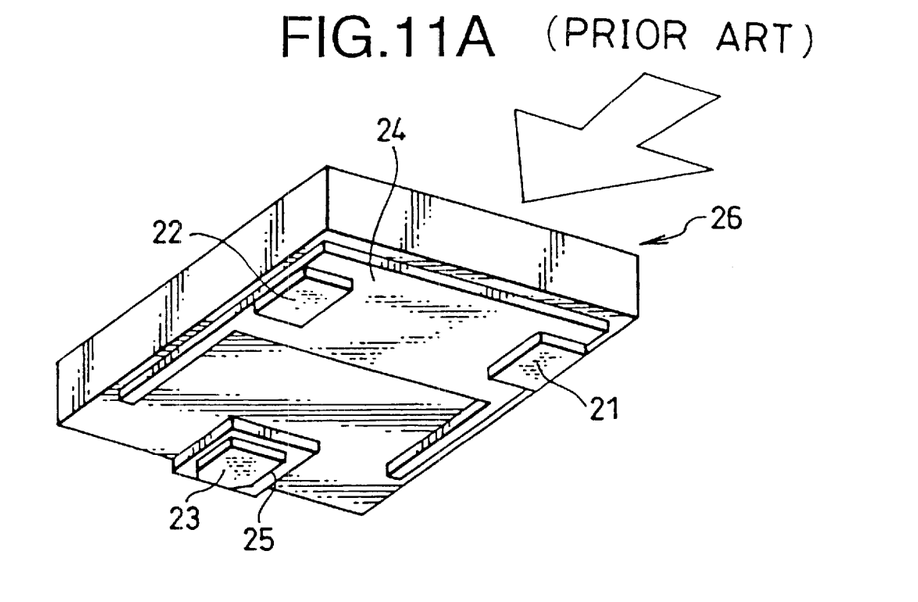
FIG. 11A is a perspective view of a conventional pad-type slider, viewed from underneath.
Figure 11B:
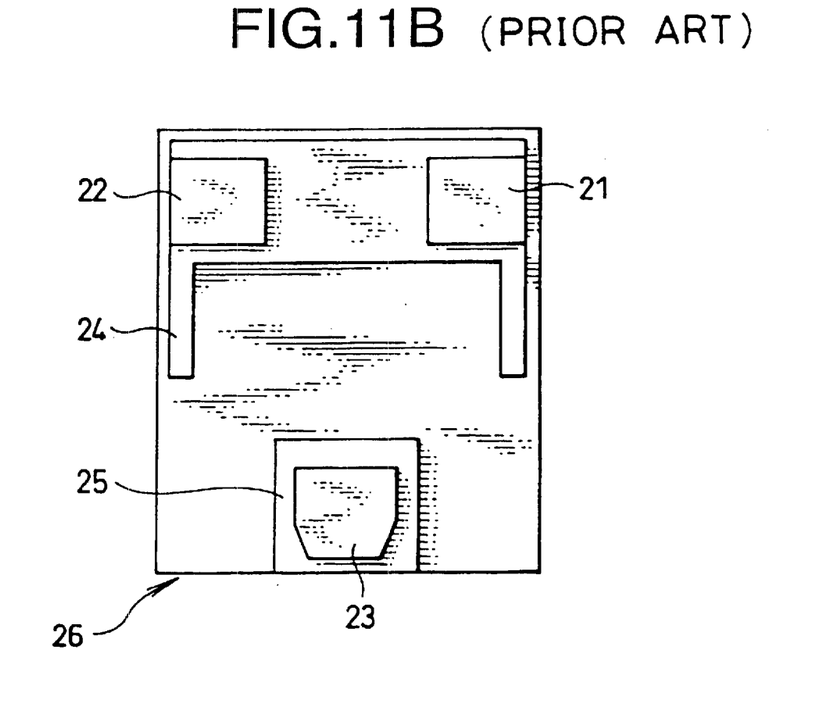
FIG. 11B is a plan view thereof.

In addition, in recent years, in order to stabilize the floatation of the slider, such a slider 26 having a plurality of pad-shaped rails 21 to 25, as shown in FIG. 11, prevails among the sliders. It is known that such a slider 26 having the pad-shaped rails 21–25 is superior in dynamic floating stability, brings less lowering in floating height in rare air, however, on the other hand, in a case where the slider 26 comes into contact with the magnetic disk due to vibration or shock, the magnetic disk may be damaged with the sharp corner of the rails 21 to 25.

Figure 4:
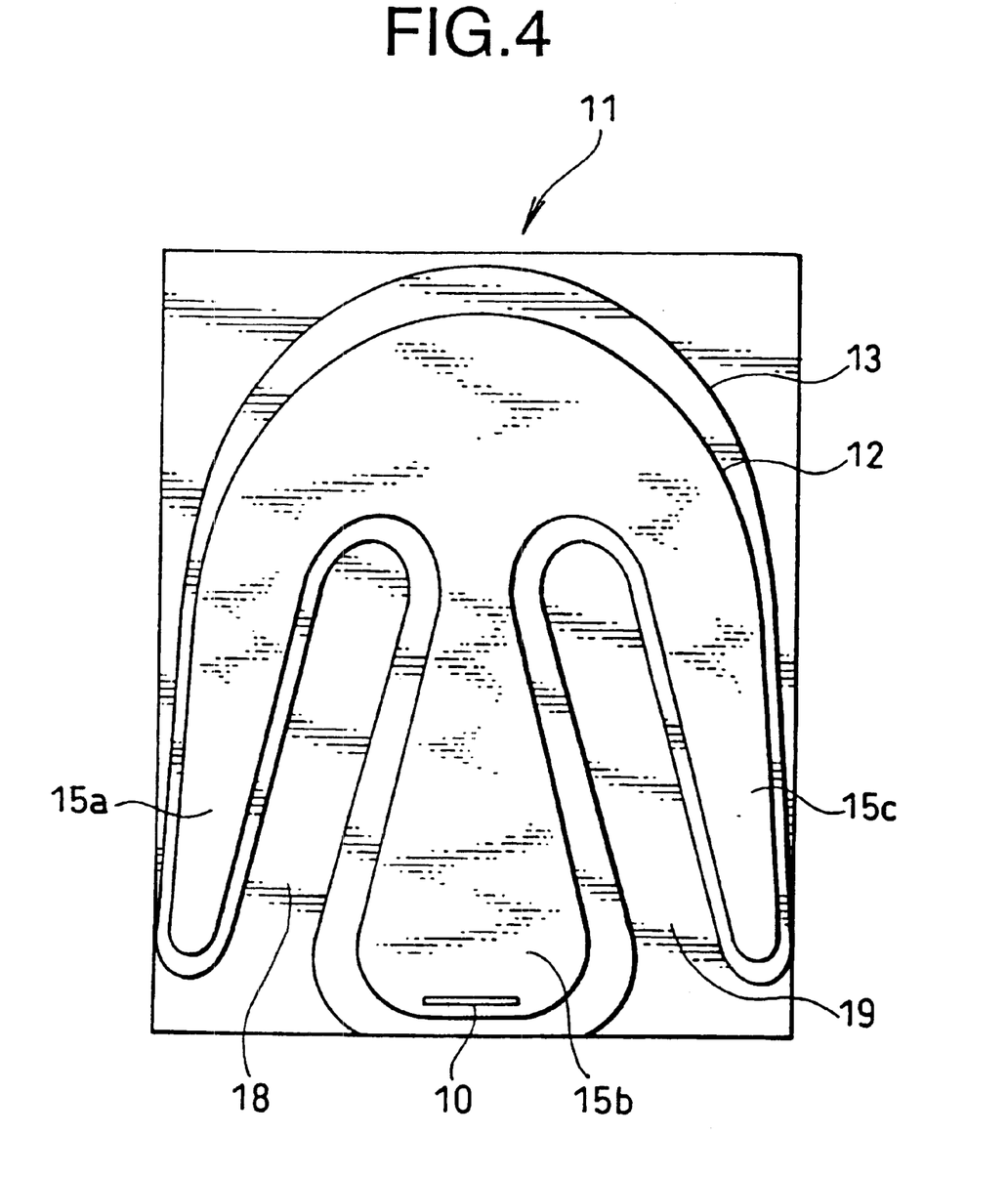
FIG. 4 shows another form of the slider shown in FIG. 2.
Figure 5:
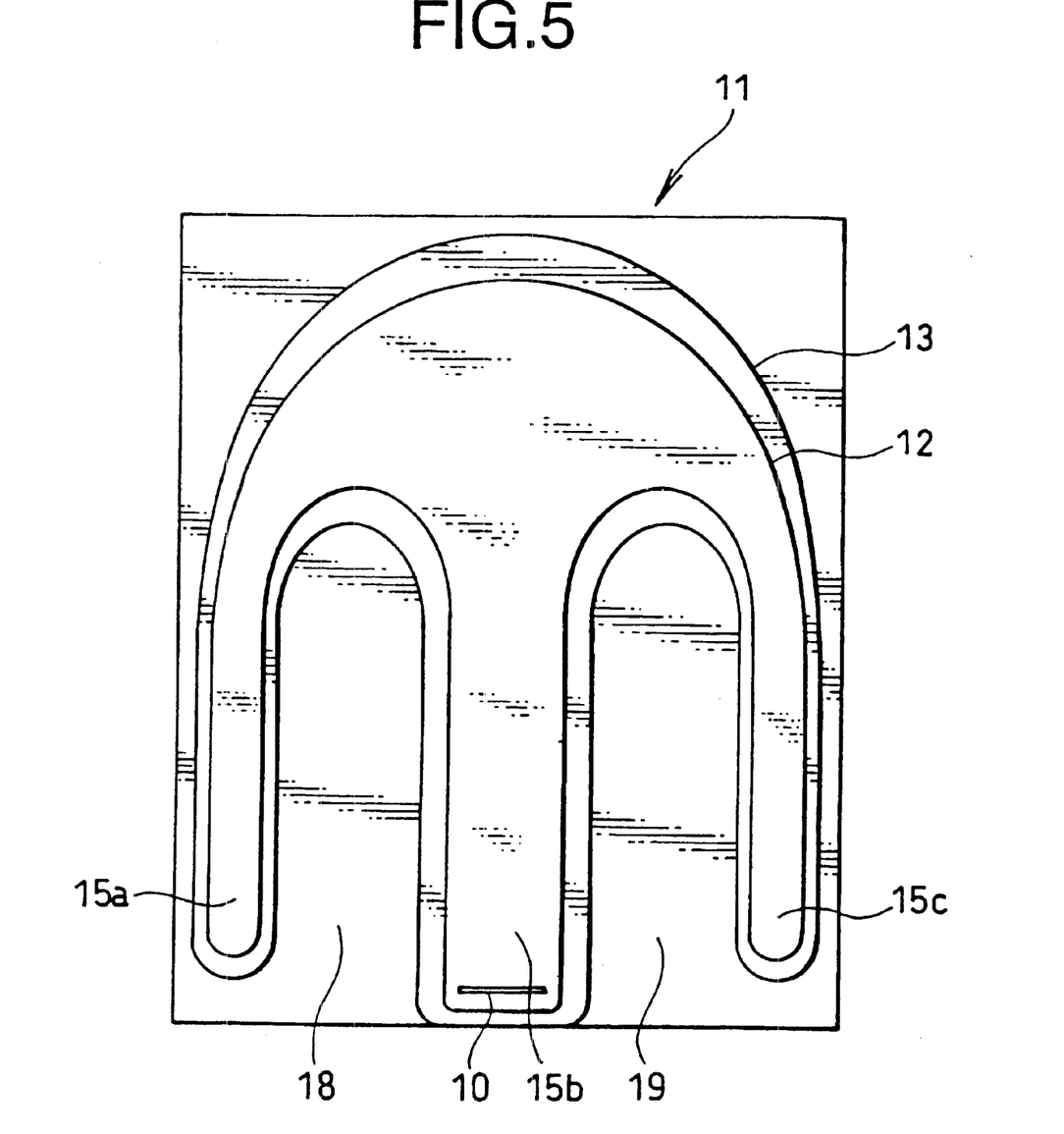
FIG. 5 similarly shows still another form of the slider shown in FIG. 2.
Figure 6:
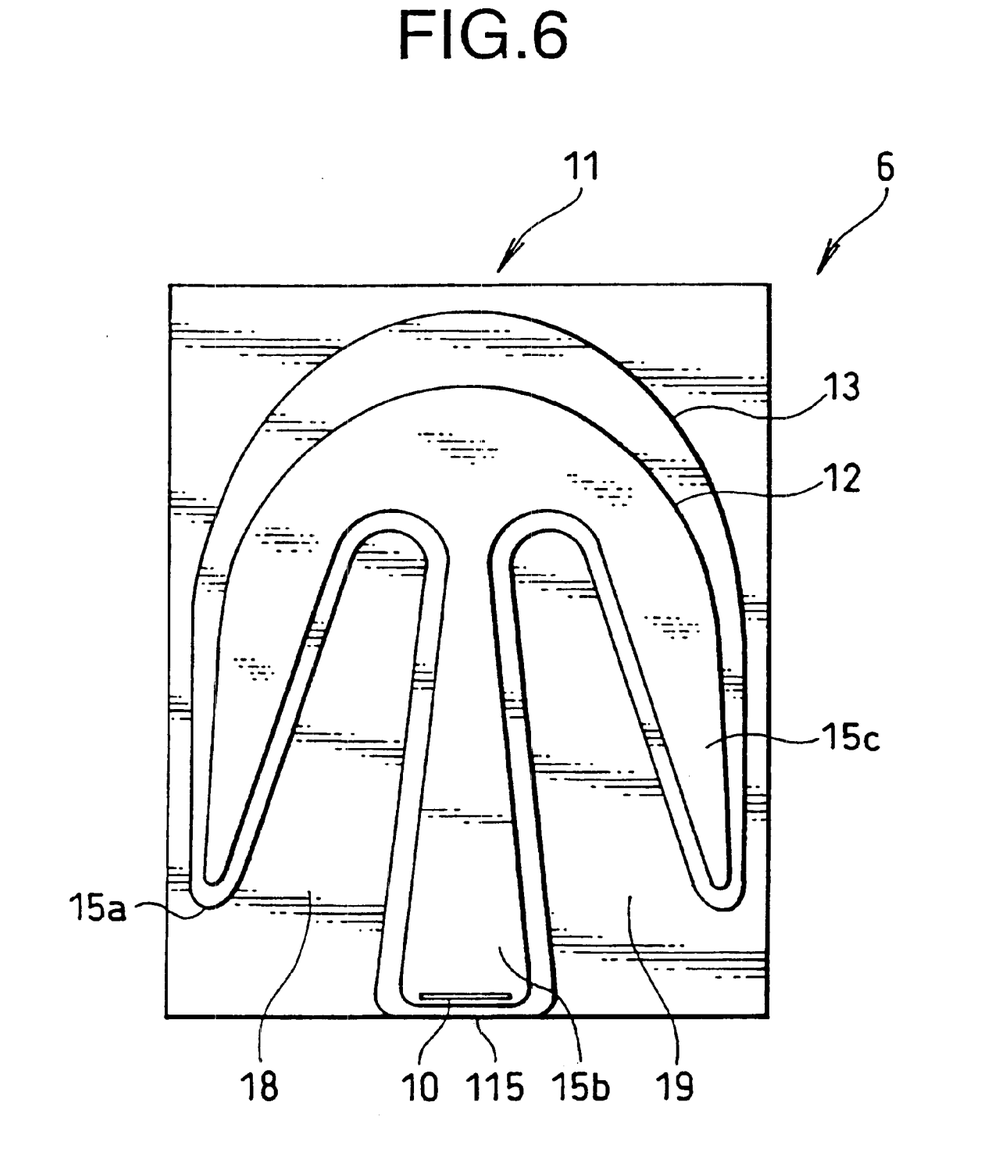
FIG. 6 similarly shows still another form of the slider shown in FIG. 2.
Figure 7:
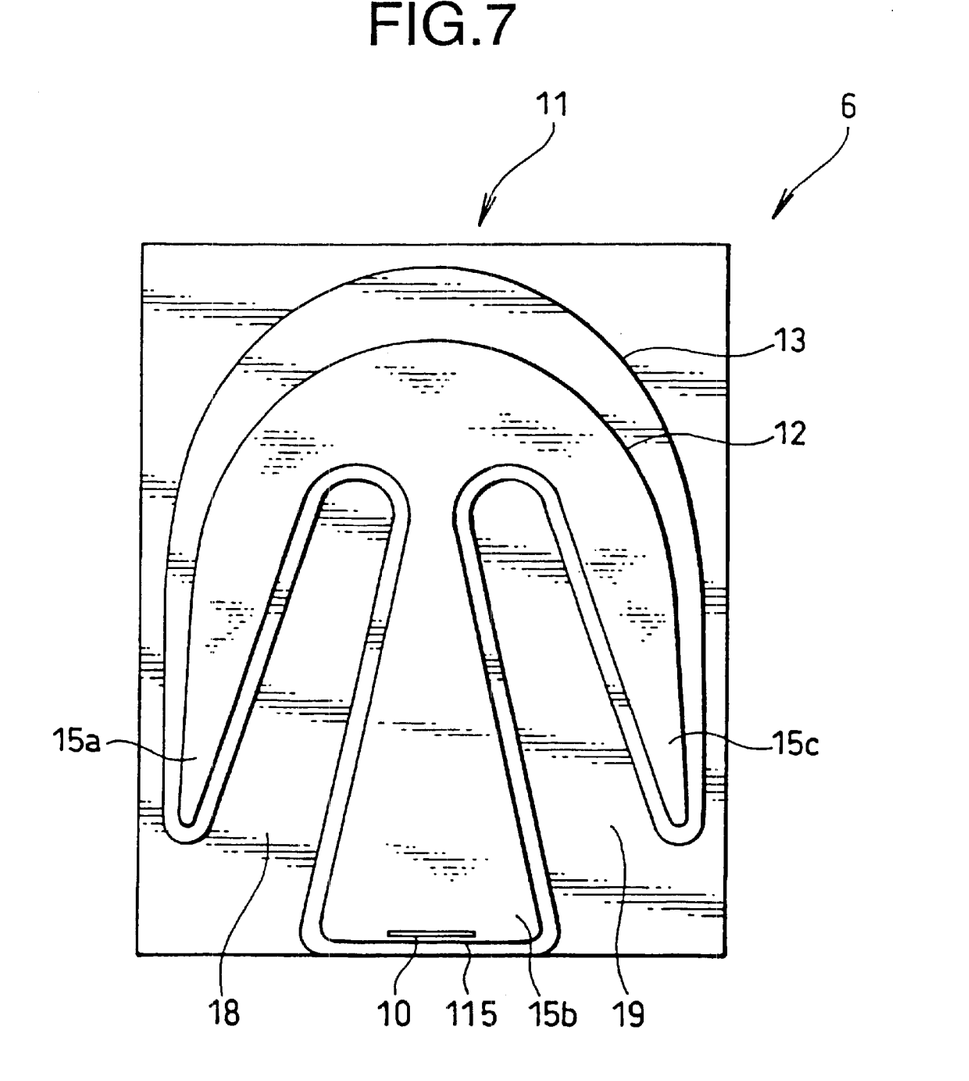
FIG. 7 similarly shows still another form of the slider shown in FIG. 2.
Figure 8:
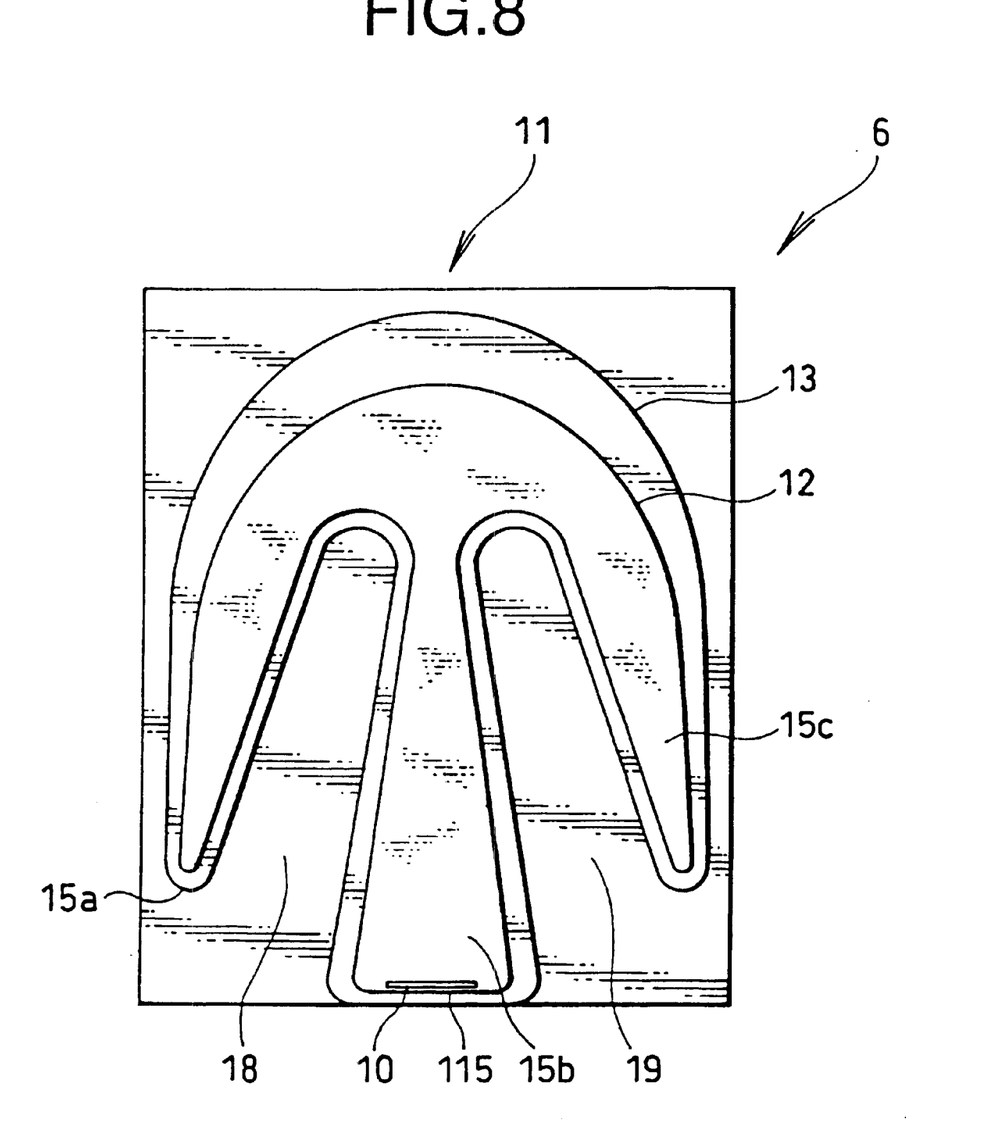
FIG. 8 similarly shows still another form of the slider shown in FIG. 2.
Figure 9:
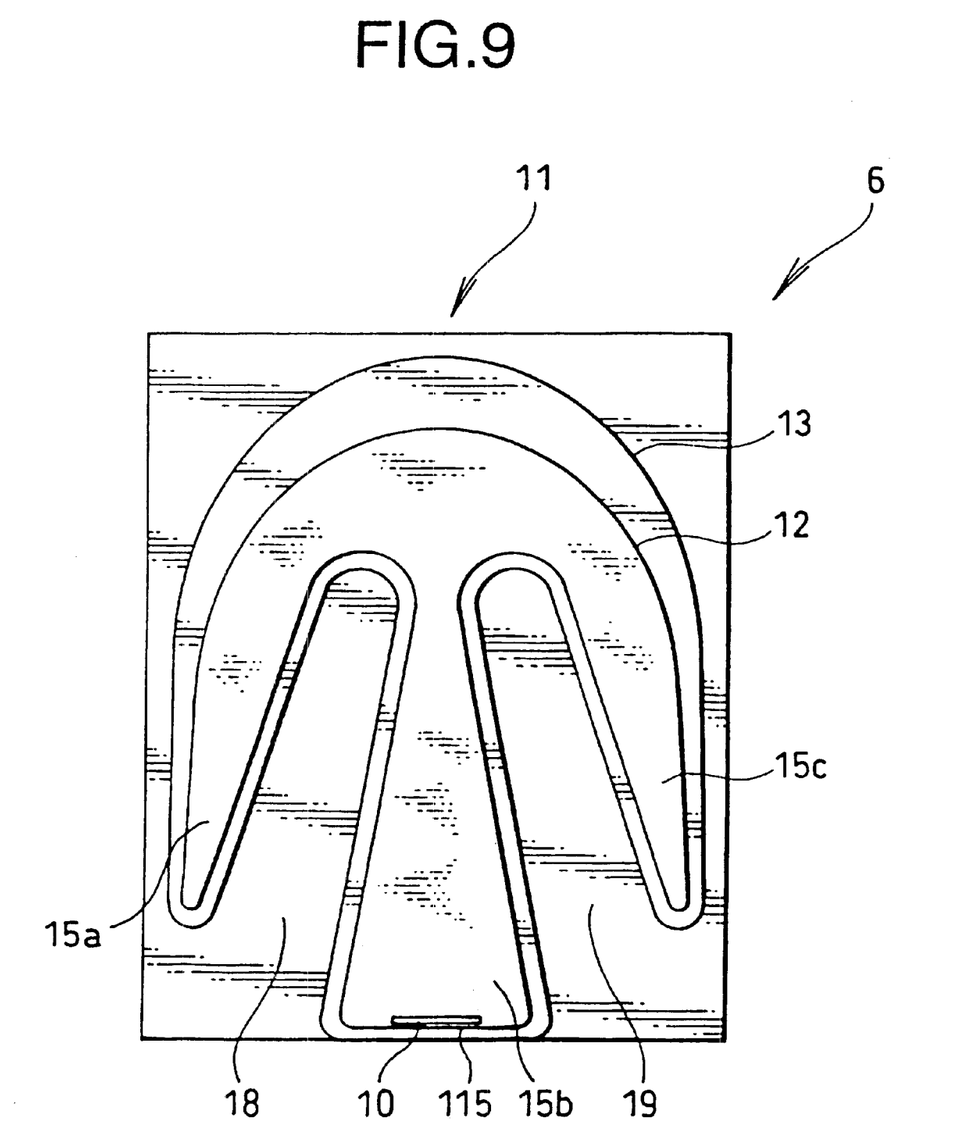
FIG. 9 similarly shows still another form of the slider shown in FIG. 2.

On the other hand, since all the rails are formed to be endless with straight lines and arcs for connecting end portions of the straight lines, the slider 6 of the present embodiment is effective in preventing the magnetic disk from being damages. The present embodiment has been described with reference to FIGS. 3A to 3C, however, it is also possible to utilize a slider having a shape as shown in FIGS. 4 to 9, for example. In FIG. 4, a tip portion (to which the magnetic head is attached) of the leg portion 15b has a larger area. In addition, each of the leg portions 15a and 15c has a narrower tip portion. In FIG. 5, all the rails of the leg portions 15a to 15c are arranged to be parallel, and areas of the leg portions 15a and 15c are made to be smaller while the negative pockets 18 and 19 are arranged to be larger. FIGS. 6 to 9 show modified examples in which the area of the bottom 115 of the leg portion 15b are varied, respectively. As described above, although the shape of the leg portion and the negative pressure pocket can be diversely arranged, the rails are formed with straight lines and arcs for connecting ends of the straight lines in every embodiment. In addition, the rail is constituted to be endless with continuity, and the rail plane has a single peak toward an air introducing end.

Example

Now, a result of a test comparing durabilities of the conventional pad-type slider 26 and the slider 6 of the present embodiment will be described.

Three kinds of sliders were used for the comparing test: the first slider is a slider having pad-type rail planes (as shown in FIG. 11), the second and the third sliders are those according to the present invention (as shown in FIGS. 3A to 3C). A ratio of the first rail for the total area of the air bearing surface of the slider in each of the first to third sliders is 15.2%, 34.4% and 41.9%, respectively. All sliders are in size of 1.25×1.0×0.3 mm, and application load thereto by a suspension is 3.0 gf.

Figure 12:
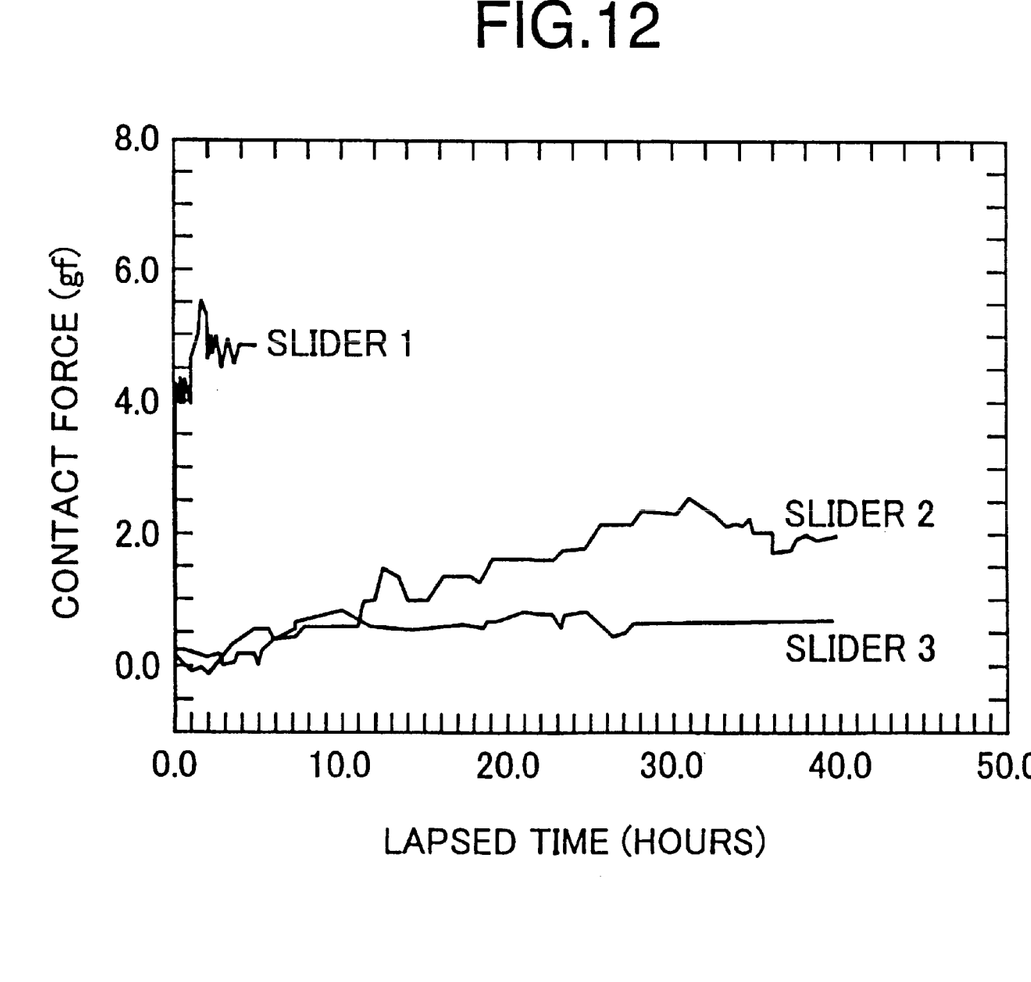
FIG. 12 is a graph showing a result of a comparative test according to the present invention.

The comparing test is conducted such that the three kinds of sliders are floated for a long time in a controlled dust existing atmosphere so as to measure a contact force between the slider and the disk, at regular intervals. Results of the comparing test are shown in FIG. 12.

According to FIG. 12, the contact force rises first in the conventional pad-type slider (that is shown in FIG. 11), and next, one of the sliders of the present invention, whose area ratio of the first rail plane is 34.4%, and subsequently, the other one whose area ratio being 41.9%. In other words, it is found that the smaller the area ratio of the first rail plane against the total area of the slider, the earlier the contact force rises. Thus, it is found that a slider of the present invention is more superior to a conventional slider.

In addition, although it is not described precisely, an acceleration coefficient of this experimental test is about 1000 times in view of another experimental test, and thus, the durability of 40 hours or more in this experimental test is required to guarantee a durability of five years or more of the slider being used in a device. On the other hand, the contact force rises sharply in the conventional slider, and the rails and the disk were damaged in a short time during the experimental test, quality of product level cannot be guaranteed.

On the other hand, in view of the result of the experimental test, it becomes possible to guarantee reliability of product level by setting an area ratio of the first rail plane toward the air bearing surface of the slider to be 30% or more, more preferably, an area ratio of 40% or more further improves the durability.

It is noted that the present invention is not limited to the embodiment described above, and of course, various modification can be made within a scope of the invention.

For example, in the embodiment described above, the recording/reproducing apparatus is a hard disk device, however, the recording/reproducing apparatus is not limited to this case. The present invention may be applied even to a floppy disk recording/reproducing apparatus or the like only if the apparatus employs a floating type head slider.

In addition, the floating type slider described above may be a near-contact type.

What is claimed is:

1. A floating-type head slider comprising a rail plane formed to function as an air bearing in response to a kinetic pressure of an air flow caused by rotation of a recording medium and for supporting a recording and reproducing head while maintaining a predetermined gap between the head and a surface of the recording medium, wherein the rail plane is formed as a single surface including a single elliptical front portion facing an air introducing direction and, a rear portion including first and second finger-shaped portions and a third portion formed between the first and second portions, the third portion being tab-shaped and formed by three straight lines joined by two curved lines, the single elliptical front portion and the first, second, and third portions being formed by a continuous line on the single surface.

2. The floating-type head slider according to claim 1, wherein negative pressure pockets are positioned between the first and third and the second and third portions of the rail plane.

3. The floating-type head slider according to claim 1, wherein an area of the rail plane closest to the recording medium is at least 30% of an entire area of the head slider.

4. A recording and reproducing apparatus comprising a floating-type head slider having a rail plane formed to function as an air bearing in response to a kinetic pressure of an air flow resulting from rotation of a recording medium and for supporting a recording and reproducing head while maintaining a predetermined gap between the head and a surface of the recording medium, wherein the rail plane is formed as a single surface including a single elliptical front portion facing an air introducing direction and, a rear portion including first and second finger-shaped portions and a third portion formed between the first and second portions, the third portion being tab-shaped and formed by three straight lines joined by two curved lines, the single elliptical front portion and the first, second, and third portions being formed by a continuous line on the single surface.

5. The recording and reproducing apparatus according to claim 4, wherein negative pressure pockets are positioned between the first and third and the second and third portions of the rail plane.

6. The recording and reproducing apparatus according to claim 4, wherein an area of the rail plane closest to the recording medium is at least 30% of an area of the head slider.

* * * * *